United States Patent [19]

Schülzke

[11] 4,311,124
[45] Jan. 19, 1982

[54] SIGNAL GENERATOR FOR SUPPRESSION OF FUEL SUPPLY ACTUATION AT TOP ENGINE SPEED

[75] Inventor: Peter Schülzke, Oberriexingen, Fed. Rep. of Germany

[73] Assignee: Robert Bosch GmbH, Stuttgart, Fed. Rep. of Germany

[21] Appl. No.: 905,613

[22] Filed: May 12, 1978

[30] Foreign Application Priority Data

May 24, 1977 [DE] Fed. Rep. of Germany ....... 2723371

[51] Int. Cl.³ .............................................. F02D 31/00
[52] U.S. Cl. ............................. 123/333; 123/198 DB
[58] Field of Search .................. 123/102, 118, 32 EA, 123/198 DB, 198 DC

[56] References Cited

U.S. PATENT DOCUMENTS

| | | | |
|---|---|---|---|
| 3,530,314 | 9/1970 | Foerster | 328/207 |
| 3,651,793 | 3/1972 | Roth et al. | 123/102 |
| 3,757,750 | 9/1973 | Ohtani | 123/102 |
| 3,884,203 | 5/1975 | Cliffgard | 123/118 |
| 3,914,619 | 10/1975 | Talmage et al. | 123/102 |
| 4,058,106 | 11/1977 | Drews et al. | 123/118 |

FOREIGN PATENT DOCUMENTS 2149823  4/1973  Fed. Rep. of Germany ...... 123/102

Primary Examiner—Charles J. Myhre
Assistant Examiner—Andrew M. Dolinar
Attorney, Agent, or Firm—Edwin E. Greigg

[57] ABSTRACT

A signal generator for use with a fuel supply system which incorporates a fuel shut-off mechanism. The output signal from the signal generator is applied to the fuel shut-off mechanism whenever the engine exceeds a maximum speed. In order to detect this condition, rpm-synchronous pulses are applied to at least one, and preferably two cascaded multivibrators which control an input of a gate, the other input of which receives the rpm-dependent pulses. The output of the gate is active only if the period of the rpm-dependent pulses is less than the sum of the unstable time constants of the multivibrators, in which case a final multivibrator is triggered and generates a fuel suppression control signal during a large fraction of two crankshaft rotations.

7 Claims, 3 Drawing Figures

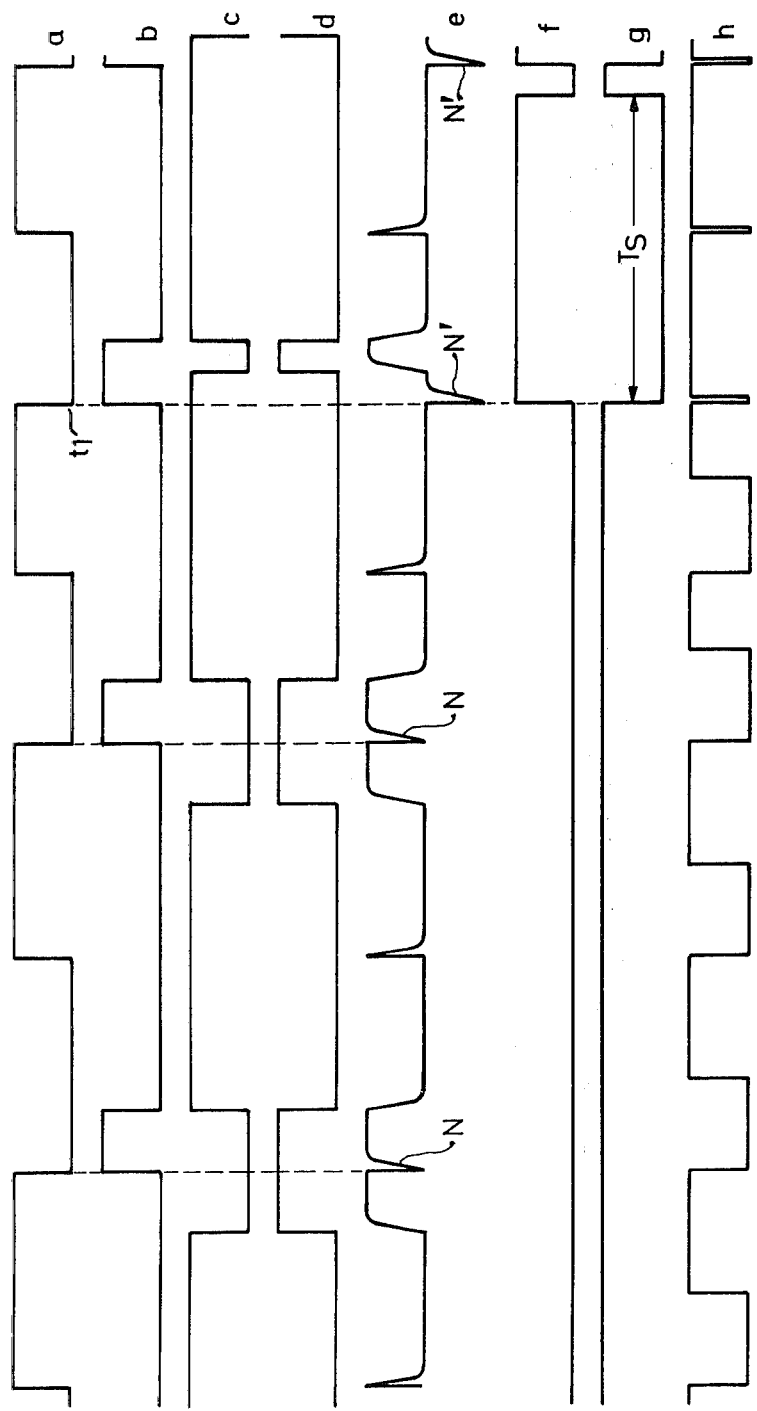

SIGNAL GENERATOR FOR SUPPRESSION OF FUEL SUPPLY ACTUATION AT TOP ENGINE SPEED

BACKGROUND OF THE INVENTION

The invention relates broadly to fuel management systems of internal combustion engines. More particularly, the invention relates to an auxiliary circuit for limiting the top speed of an internal combustion engine. Still more particularly, the invention relates to the suppression of fuel delivery to fuel-injected internal combustion engines above a predetermined speed.

Known in the prior art are systems for limiting the top speed of an internal combustion engine, for example by interrupting or short-circuiting the ignition with a suitable switch which may be actuated by centrifugal force and which is normally a part of the distributor rotor. A system of this type involves mechanical tolerances and has the disadvantage that, prior to the actuation of the switch, a mechanical displacement is required. Accordingly, the known apparatus is able to limit the engine speed only within a certain finite rpm domain but cannot act at a precisely defined limiting speed. Furthermore, the interruption of ignition pulses, while preventing combustion of the flammable mixture in the engine, does not prevent the generation of a combustible mixture which continues to be delivered into the engine and passes into the exhaust system. When ignition resumes, explosions of this uncombusted mixture may take place in the engine and the exhaust system and may cause excessive heating of, for example, an after burner or catalyzer, causing its destruction. Furthermore, the combustion of unburned mixture in the exhaust system results in undesirable exhaust gas emissions.

Also known in the art are electronic engine speed limiters, especially associated with fuel injection systems. It is a disadvantage of all these electronic systems that they normally require substantial engagement of the fuel injection system, thereby making a retrofitting virtually impossible.

An electronic rpm-limiter encounters particular difficulties if it is associated with a fuel injection system in which the fuel injection control pulses are generated by a control multivibrator in proportion to air flow rate and engine speed. In such a system, the duration of the fuel injection control pulses is equal to the time constant of the multivibrator, which in turn is defined by the inductivity of a transmitter which is actuated by induction tube pressure and which is connected in the feedback branch of a monostable multivibrator. In a system of this type manufactured by the applicant's assignee and named "D-Jetronic", the engine speed only constitutes an auxiliary control variable which is sensed by two or more trigger contacts within the distributor which generate a pulse train in which the period between pulses is subject to relatively large fluctuations.

OBJECT AND SUMMARY OF THE INVENTION

It is thus a principal object of the present invention to provide a top speed limiter for use with a fuel-injected internal combustion engine. It is a second principal object of the invention to provide a top speed limiter which accepts engine speed information which may be subject to fluctuations but which derives therefrom a precise top speed limiting signal. It is another object of the invention to provide a top speed limiter in which the engine speed is limited by a termination of fuel delivery. Yet another object is to provide a top speed limiter in which fuel delivery is shut off by actuating a fuel cut-off mechanism already present in the fuel injection system.

It is also an object of the invention to provide a top speed limiter which operates very precisely and which is essentially of digital function and thus responds very fast. Further objects are to provide a top speed limiter which can be readily retro-fitted to an already present fuel injection system requiring only a single input and a single output connection.

These and other objects are attained according to the present invention by providing a top speed limiter which includes a timing circuit, the period of which is related to engine rpm and which includes, parallel thereto, at least one gating circuit which receives rpm-dependent triggering pulses at one input and whose second input is connected to the output of the timing circuit. The gating circuit in turn actuates a second timing circuit whose output signal is used to suppress the fuel injection control pulse for the engine.

The invention will be better understood and further objects and advantages thereof will become more apparent from the ensuing detailed description of a preferred embodiment taken in conjunction with the drawing.

BRIEF DESCRIPTION OF THE DRAWING

FIG. 3 is a set of timing diagrams illustrating the voltages occurring at the various points of the circuit of FIG. 2.

DESCRIPTION OF THE PREFERRED EMBODIMENT

Figure 1:
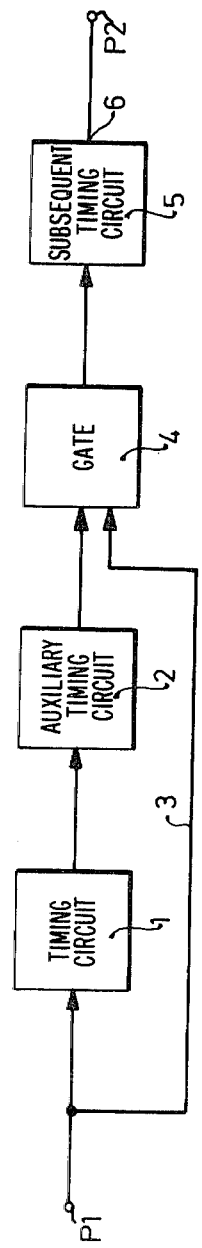
FIG. 1 is a simplified block diagram of the top speed limiter according to the present invention.

Turning to FIG. 1, there will be seen a monostable multivibrator 1 which is triggered at a point P1 by an rpm-dependent pulse train. The rpm-dependent pulse train fed to the point P1 may be, and preferably is, generated as a rectangular pulse train coming from, for example, a fuel injection system of the type "D-Jetronic" which is derived from triggering contacts located in the distributor of the engine. However, any other suitable rmp-dependent pulse train would be usable for application to the point P1. The appearance of the triggering pulse train applied to the point P1 is illustrated in FIG. 3a; it is normally present at the input divider circuit of the triggering stage of the "D-Jetronic" fuel injection system or a similar fuel injection system.

The negative-going edge of the triggering signal, which is normally generated by closing a contact (not shown) within the ignition distributor, triggers a first timing circuit 1 into its metastable state. After the expiration of the metastable time of the timing circuit 1 which may be a monostable multivibrator, the rear edge of the pulse causes a second or auxiliary timing circuit 2 to be triggered into its metastable state. The sum of the unstable times of the timing circuits 1 and 2 corresponds in the present exemplary embodiment to the duration of two crankshaft rotations at the desired top speed $n_{max}$. If the engine is operating in a speed domain $n > n_{max}$, i.e. above the desired top speed, the timing circuit 2 will still be residing in its metastable state while a new negative-going edge occurs at the input contact P1 and thus causes a renewed triggering of the timing circuit 1. The input pluses are fed via a parallel line 3 to a logical gate 4 which permits passage of the pulse coming through the line 3 provided that the timing circuit 2 is still residing in its metastable state, in which case it transmits the pulse to a subsequent timing circuit 5. The output 6 of the timing circuit 5 will then carry an output signal which may be applied to a suitable circuit point within the electronic fuel injection system to cause suppression therein of the fuel injection control pulses which are normally supplied to the injection valves of the engine. In the present preferred exemplary embodiment of the invention, the rmp limiting circuit illustrated causes the output signal at the point P2 to go to zero voltage or ground potential when fuel suppression is intended. This circuit point P2 is preferably connected to the idling contact of the fuel injection system and is used thereby to simulate engine overrunning (negative torque) which is a condition that the fuel injection system interprets to initiate a cut-off of the fuel injection control pulses and thus a termination of fuel supply.

If the engine is operating at a speed in the region $n < n_{max}$, both timing circuits 1 and 2 will have returned to their stable state at a time when the input point P1 experiences a new negative-going edge of the trigger pulse. Due to the fact that the timing circuit 2 is in the stable state and thus applies an appropriate input to the gate 4, the latter will not permit passage of the renewed triggering pulse arriving on the line 3. Accordingly, the timing circuit 5 will not be actuated in the speed domain $n < n_{max}$ and remains in its normal, stable state. Thus the circuit of the invention does not engage the fuel injection system via the point P2 and no fuel suppression takes place.

If the engine exceeds its top speed, the timing circuit 5 will be triggered by every negative-going edge occurring at the point P1. The time constant of the circuit 5 is so chosen as to be equal to approximately 75% of the time required for two crankshaft rotations at the top speed $n_{max}$. In this way, each triggering of the timing circuit 5 will cause suppression of fuel injection pulses even if, as is the case in the preferred associated "D-Jetronic" fuel injection system, injection takes place at each and every crankshaft rotation. A time constant equal to 75% of two crankshaft rotations insures that the pulses generated by both of the fuel injection valve actuators are suppressed and no injection takes place at all. Thus when the engine constantly exceeds its top speed, all of the fuel injection control pulses are suppressed and no fuel supply takes place.

Figure 2:
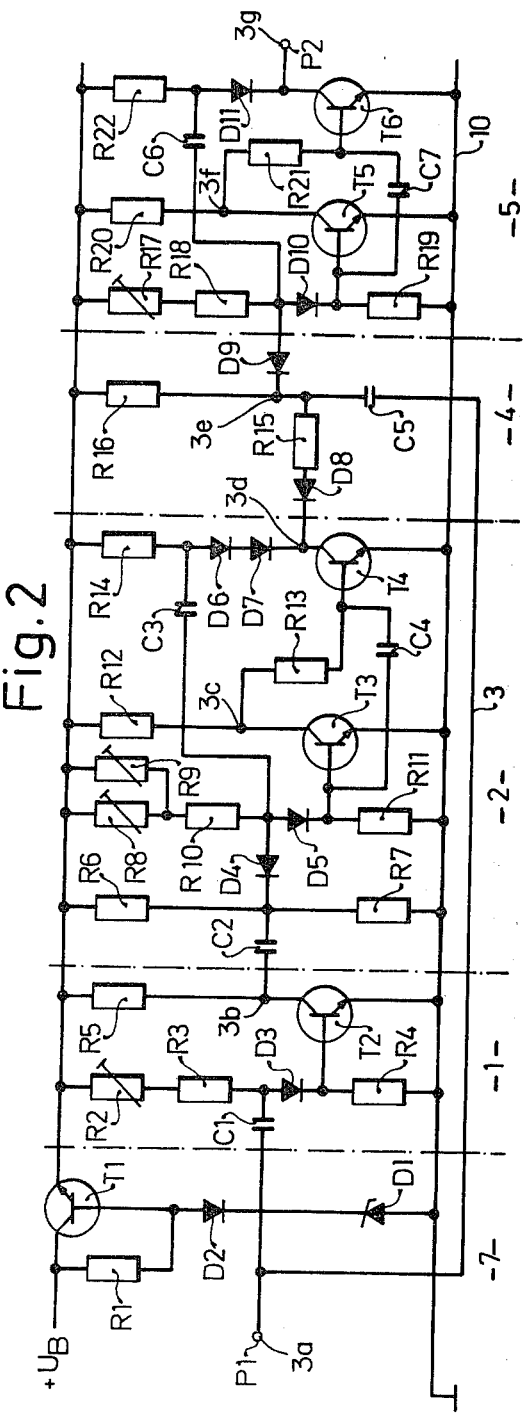
FIG. 2 represents a detailed circuit diagram of the apparatus of the invention related to the blocks of FIG. 1.

A detailed circuit diagram of the apparatus according to the invention is shown in FIG. 2. The apparatus illustrated here further includes a voltage regulator circuit 7 consisting of a transistor T1 whose base is connected to a voltage divider circuit consisting of the Zener diode D1, a diode D2 and a resistor R1, all connected between the positive and negative supply lines. The remaining circuit is seen to be divided by dash-dotted lines into regions which substantially correspond to the elements illustrated as blocks in FIG. 1.

In particular, the block 1 is seen to be a monostable multivibrator consisting substantially of a single transistor T2. Every negative-going edge arriving at the point P1 flips this circuit into its unstable state by applying a negative voltage to the anode of the diode D3 causing it to block and thus preventing the supply of positive voltage to the base of the transistor T2 via the resistors R2 and R3. Accordingly, the transistor T2 blocks and its collector carries approximately the voltage $+U_B$. The capacitor C1 is charged at the time constant $\tau = (R2 + R3) \cdot C1$ until the diode D3 again conducts and thereby causes the transistor T2 to conduct at which time its collector has a voltage equal roughly to the saturation voltage.

The negative pulse occurring at that time passes via the differentiating element consisting of the capacitor C2 and the resistors R6 and R7 to the timing circuit 2 consisting of a monostable multivibrator which is triggered via the diode D4. This triggering pulse blocks the diode D5 which is part of a base voltage divider circuit further including the resistors R9 and R11 and is connected to a transistor T3 which cooperates with a transistor T4 to constitute the monostable multivibrator 2. When the diode D5 blocks, so does the transistor T3 due to the absence of base current, thereby rendering the transistor T4 conducting via resistors R12 and R13 and further increasing the voltage at the anode of the diode D5 in the negative direction via the feedback capacitor C3. The recharging of the capacitor C3 takes place at a time constant t,0110
until the diode D5 and hence the transistor T3 are again rendered conducting. When the transistor T3 conducts, the transistor T4 blocks and the circuit flips back into its stable state thanks to the feedback via the capacitor C3, causing the transistor T3 to conduct and the transistor T4 to block. The two base electrodes of the transistors T3 and T4 are connected via the capacitor C4 which serves in known fashion as an interference suppressor element while the diodes D6 and D7 in the collector circuit of the transistor T4 serve for temperature compensation of any drift in the conduction potentials of the diode D5 and of the base-emitter junction of the transistor T3.

As discussed above, the sum of the unstable time constants of the timing circuits 1 and 2 defines the reference time, equal to the period of the pulses present at the point P1 when the engine operates at the limiting speed $n_{max}$. It is required that the limiting rpm remain constant within a relatively wide domain of temperature and voltage and, accordingly, these unstable time constants must have as little drift as possible. Accordingly, the time circuit 1 is so dimensioned that its unstable time constant is equal to only approximately 15 percent of the overall reference time while the remaining 85 percent are assigned to the time constant of the timing circuit 2. Thus, the timing circuit 2 is embodied as a monostable multivibrator consisting of two well-compensated transistors while the time circuit 1 is optimized by suitable dimensioning but without excessive expenditure for circuit components.

Following the timing circuit 2 is a logical circuit 4 consisting of a differentiating element made up of a capacitor C5 which is connected via line 3 with the input point P1. The resistors R15, R16 are connected as shown, the former being connected via the diode D8 to the collector of the transistor T4 and hence to the output of the timing circuit 2. When the latter is in its stable state, a voltage lying at only a few volts above ground potential of the negative potential of line 10 is applied via the diode D8 to the diode D9. Accordingly, a negative-going transition at the point P1 is differentiated into a negative spike which pulls the cathode of the diode D9 far below the zero voltage of line 10 and thus causes a triggering of the subsequent timing circuit 5. This triggering takes place whenever the timing circuit 2 is still in its metastable state, i.e. when the engine operates at a speed higher than $n_{max}$. If $n < n_{max}$, i.e. if the engine speed is not to be limited, the timing circuit 2 will have returned to its stable state when the pulse at the point P1 undergoes a negative transition so that the voltage at the cathode of the diode D9 is then approximately at the positive voltage level $+U_B$. Accordingly, the negative differentiated spike pulls the voltage at the junction of the elements D9, C5, R15 and R16 to only a few volts above the zero potential which is not sufficient to unblock the diode D9 and thus the timing circuit 5 is not triggered in this case.

In the case where the engine speed is greater than $n_{max}$, and when the triggering pulses pull the voltage at the cathode of the diode D9 below zero volt, the diode D10 and thus the transistor T5 are blocked due to the fact that the diode D10 is a portion of the base voltage divider circuit R17, R18, R19 of the transistor T5. Otherwise, the timing circuit 5 is also a monostable multivibrator, substantially equal to that of the timing circuit 2 and thus will not be discussed in detail. When T5 blocks, T6 becomes conducting, the circuit 5 enters it metastable state and the conducting transistor T6 places the voltage at the circuit point P2 at the saturation voltage of the transistor, i.e. approximately at the zero voltage level. In the preferred exemplary use of the present invention, i.e. in association with an electronic fuel injection system, this negative potential at the point P2 is used to simulate a closed idling switch, thus simulating conditions requiring fuel shut-off. The electronic fuel injection system has a circuit which provides fuel shut-off for a closed idling contact so that, at engine speeds higher than approximately 2000 rpm, the fuel injection pulses are suppressed if the idling contact is closed, i.e. if a low signal is present at the point P2 and fuel supplied to the engine is completely suppressed.

If the timing circuit 5 remains in its stable, untriggered state, the transistor T6 remains blocked and the point P2 remains at high potential which has no influence on the fuel shut-off portion of the associated fuel injection system in the preferred exemplary case.

The voltage regulator circuit 7 is protected against polarity reversal and serves also for immunity against voltage fluctuations and can compensate for small voltage drifts.

As has been discussed above, the circuit of the present invention uses a full period of the pulse train present at P1 and illustrated in FIG. 3a as a comparison with a reference time. In the present example, if the period of the triggering pulses at the point P1 is shorter than the reference time, then fuel supply is suppressed for the next period of triggering pulses. The curve illustrated in FIG. 3b shows the collector voltage at the transistor T2 and it will be noticed that the time constant of the timing circuit 1 is relatively short compared with that of the timing circuit 2 which is present at the collector of T3 and is illustrated in FIG. 3c.

The positive collector voltage at the transistor T4 and shown in FIG. 3d insures that, for the engine speed domain less than $n_{max}$, the needle pulses N shown in FIG. 3e, which are derived from the negative-going edge of the triggering pulses and which are applied to the cathode of the diode D9, cause the potential there to fall below zero. However, if the timing circuit 2 is still in its metastable state, as will be the case when the engine operates at a speed higher than $n_{max}$, for example at the time $t_1$ shown in FIG. 3, the collector potential of the transistor T4 will be low, permitting the negative-going needle pulse N' to pull the voltage at the diode D9 well below the zero level, as previously explained, so that the collector of the transistor T6 will carry negative voltage 3g for the considerable time $T_S$ and thus prevent the generation of fuel injection pulses 3h as previously explained. The time $T_S$ which is the time constant of the circuit 5, endures until shortly prior to the arrival of the next negative-going edge of the triggering pulse of the pulse train in 3a at the limiting speed $n_{max}$, thereby insuring that no fuel injection pulses can be generated by the associated fuel injection system.

It is possible, in principle, to compare only a portion of the period of the triggering pulses with a certain reference time and to derive therefrom information regarding the question if the engine speed n is greater or smaller than the limiting speed $n_{max}$. However, to do so can be recommended only if the portion of the period being used is very precisely defined because any imprecision in the opening and closing events of the mechanical contacts in the distributor would result in an imprecision of the limiting speed $n_{max}$. It can be advantageous to use only a portion of the incoming period because the reference time may be formed by a single timing circuit to take the place of the present timing circuits 1 and 2.

It is however preferred, and is a feature of the present exemplary embodiment resulting in precision which is independent of any possible imprecisions of the opening and closing angle of the triggering contacts in the distributor, that the time period which is analyzed is the entire period of the incoming rpm pulse, in particular if the present invention is to be used in association with a fuel injection system of the type "D-Jetronic". In that case, the reference time is precisely equal to the period at limiting rpm $n_{max}$ and is generated by two monostable flip-flops, insuring that even when the maximum speed is exceeded, the reference time is restarted at each new period of the triggering pulse.

The foregoing relates to preferred exemplary embodiments of the invention, it being understood that other embodiments and variants thereof are possible within the spirit and scope of the invention.

What is claimed and desired to be secured by Letters Patent of the United States is:

1. An apparatus for rpm-limitation in an internal combustion engine, said engine including fuel preparation and metering means, comprising:

ignition contact means for generating a train of electrical pulses which vary in response to engine rpm, each pulse in said train having a positive-going and a negative-going edge;

a first timing circuit having an input contact to receive the train of electrical pulses, for generating a first timing signal of finite duration having a positive-going and a negative-going edge, the onset of said first timing signal being determined by the arrival of a predetermined edge of each pulse in said train of electrical pulses;

an auxiliary timing circuit, connected to the first timing circuit, for receiving said first timing signal and for generating an auxiliary timing signal the onset of which is determined by the arrival of a predetermined edge of said first timing signal;

a gating circuit, connected to the auxiliary timing circuit, for receiving said auxiliary timing signal and having an input contact to receive said train of electrical pulses, said gating circuit generating a trigger signal in synchronism with said train of electrical pulses whenever said auxiliary timing signal is present and said predetermind edge of said pulse in said train of pulses is occurring at a preselected engine threshold rpm; and a subsequent timing circuit, connected to the gating circuit, for receiving said trigger signal and for generating a control signal of finite duration in response to said trigger signal, said control signal being generated in synchronism with said trigger signal and serving to cut off fuel administration to the engine for the duration of said control signal.

2. The apparatus as defined by claim 1, wherein each of said first, auxiliary and subsequent timing circuits includes an input voltage divider having a diode, and a semiconductor switch having a control electrode, said diode being connected to the control electrode of the semiconductor switch; whereby when a triggering pulse is applied to said diode it causes non-conduction of said semiconductor switch.

3. The apparatus as defined by claim 1, wherein said gating circuit includes a diode and a differentiating component which is connected via the diode to receive the output of said auxiliary timing circuit, said differentiating component receiving said train of electrical pulses; whereby when said auxiliary timing signal is present at the output of said auxiliary circuit, the differentiated pulse, generated by the predetermind edge of a pulse from said train of electrical pulses, is transmitted to said subsequent timing circuit for triggering same, thereby effecting the generation of said control signal.

4. The apparatus as defined by claim 1, wherein said first timing circuit comprises a monostable multivibrator including a capacitor, an input voltage divider circuit connected to the capacitor, and a transistor having a collector, and a base which is connected to the input voltage divider circuit, said input voltage divider circuit receiving said train of electrical pulses via the capacitor.

5. The apparatus as defined by claim 4, wherein said auxiliary timing circuit comprises a monostable multivibrator including two transistors and a capacitor, said two transistors being connected via the capacitor of said auxiliary timing circuit to the collector of the transistor of said first timing circuit, and wherein the unstable time constant of said auxiliary timing circuit is a multiple of the unstable time constant of said first timing circuit.

6. The apparatus as defined by claim 5, wherein the unstable time constant of said subsequent timing circuit is at least 75% of the period of said electrical pulses in said train of electrical pulses.

7. An apparatus for supplying a fuel-air mixture to an internal combustion engine, including means for generating valve actuation signals and electrical means for suppressing said valve actuation signals upon the application of a control signal, and wherein the improvement in said apparatus comprises:

means for generating a train of electrical pulses, each pulse in said train having a positive-going and a negative-going edge;

a first timing circuit having an input contact to receive the train of electrical pulses, for generating a first timing signal of finite duration having a positive-going and a negative-going edge, the onset of said first timing signal being determined by the arrival of the negative-going edge of a pulse in said train of electrical pulses;

an auxiliary timing circuit, connected to the first timing circuit, for receiving said first timing signal and for generating an auxiliary timing signal the onset of which is determined by the arrival of the negative-going edge of said first timing signal;

a gating circuit, connected to the auxiliary timing circuit, for receiving said auxiliary timing signal, and having an input contact to receive said train of electrical pulses, said gating circuit generating a trigger signal in synchronism with said train of electrical pulses whenever said auxiliary timing signal is present; and a subsequent timing circuit, connected to the gating circuit, for receiving said trigger signal and for generating a control signal of finite duration in response to said trigger signal; whereby said control signal is generated if the frequency of said train of electrical pulses exceeds the value at which its period equals the sum of said first timing signal and said auxiliary timing signal, and wherein said control signal is generated in synchronism with said trigger signal and suppresses the delivery of said valve actuation signals and thereby inhibits the supply of fuel to the associated internal combustion engine.

* * * * *